G. L. PERRINE.
HOSE REEL.
APPLICATION FILED JUNE 4, 1918.

1,339,785.

Patented May 11, 1920.

INVENTOR
G.L. Perrine,
BY
ATTORNEYS

UNITED STATES PATENT OFFICE.

GEORGE L. PERRINE, OF PORTLAND, OREGON.

HOSE-REEL.

1,339,785.     Specification of Letters Patent.     Patented May 11, 1920.

Application filed June 4, 1918. Serial No. 238,169.

*To all whom it may concern:*

Be it known that I, GEORGE L. PERRINE, a citizen of the United States, and a resident of Portland, in the county of Multnomah and State of Oregon, have invented a new and useful Improvement in Hose-Reels, of which the following is a specification.

My invention is an improvement in hose reels and has for its object to provide a device of the character specified, wherein the hose may be permanently connected with the source of water supply while on the reel, to permit any portion of the hose to be withdrawn from the reel for use without disarranging the said connection.

In the drawings:—

Figure 1:
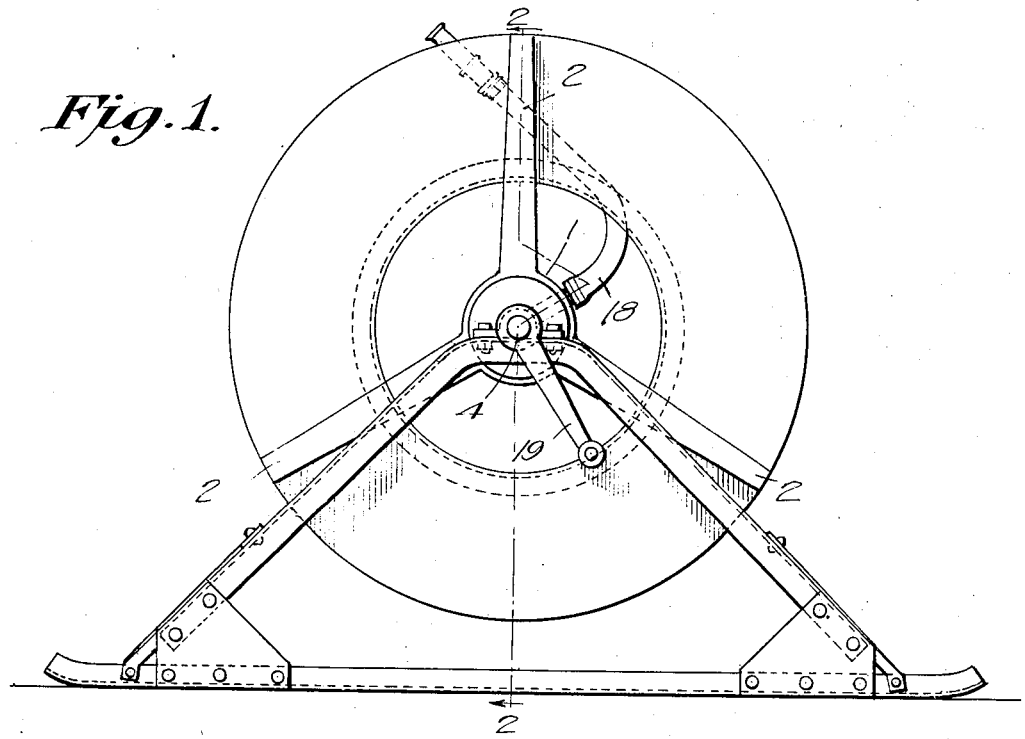
Figure 1 is an end view of the improved reel.
Figure 2:
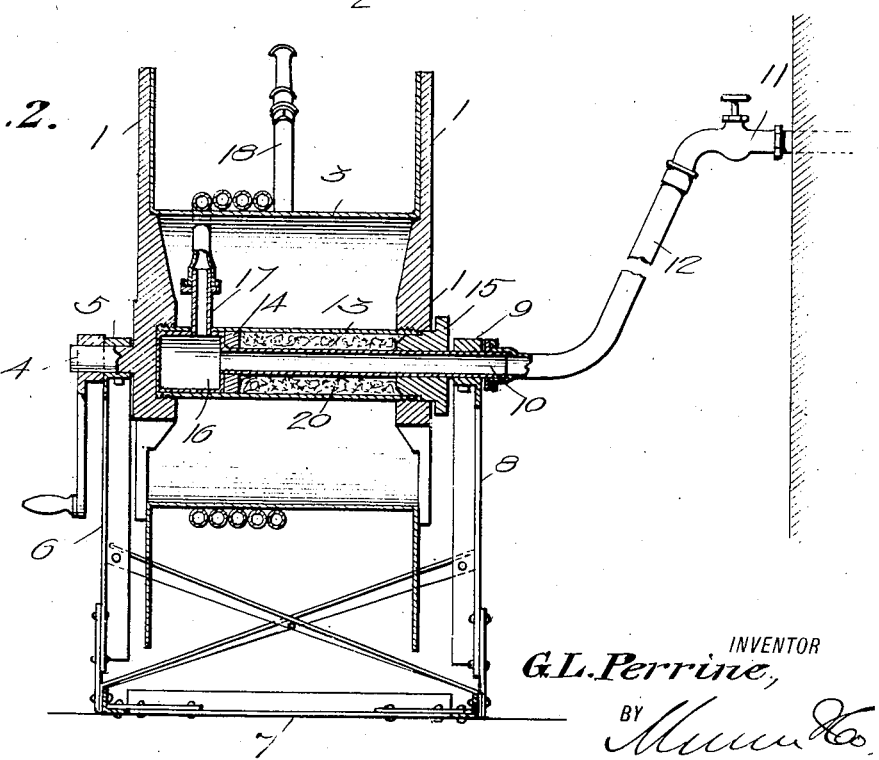
Fig. 2 is a section on the line 2—2 of Fig. 1, looking in the direction of the arrow adjacent to the line.

In the present embodiment of the invention the reel consists of spaced hubs 1, each of which has three radial arms 2, the said arms extending at angles of approximately one hundred and twenty degrees with respect to each other, and the hubs and arms are connected by a channel-shaped body 3 which consists of a portion coaxial with the hubs, and side flanges which are secured to the arms 2. One of these hubs has a journal pin 4 which is journaled in a sectional bearing 5 in a supporting bracket 6 which is secured to a base 7. Another supporting bracket 8 is provided, the said bracket having a sectional bearing 9, in which is journaled a hollow shaft 10. This shaft extends beyond the bearing at one end and is adapted for connection with a source 11 of water supply by means of a flexible hose 12.

A cylindrical casing 13 is arranged at the axis of the reel 1—2—3, the said casing having threaded engagement with the hubs at its ends and the hollow shaft 10 is arranged at the center of the casing, being held in spaced relation with respect to the casing by a washer 14 and a nut 15, the washer being at the inner end of the shaft, while the nut is at one of the hubs. This shaft provides the other journal pin for mounting the reel, the pin 4 moving in one of the bearing brackets while the shaft moves in the other.

A cylindrical chamber 16 is connected with the inner end of the shaft 10, the said chamber filling the casing 13 at the end remote from the bracket 8, and the said chamber communicates with the shaft 10, so that the water flowing from the source of supply 11 may pass into the chamber 16 through the hollow shaft. This shaft has a radially extending nipple 17 which extends from an opening in the casing 13 and is adapted for connection with the inner end of the hose indicated at 18. This hose winds upon the reel which, as shown, is of considerable diameter, so that the bore of the hose is not constricted in any way when it is wound upon the reel.

A suitable crank 19 is connected with the journal pin 4 for turning the reel to wind up the hose, the hose being unwound by pulling on the same in the usual manner.

In operation the water flows from the source of supply through the hose 12 into the hollow shaft 10 and into the chamber 16, passing from this chamber through the nipple 17 to the hose. As much of the hose may be used as may be desired and however much is unwound the flow of the water through the hose is not interfered with in any manner. As shown, the base 7 and the brackets 6 and 8 are of angle material and are suitably braced by inclined braces and bracing plates to provide a substantial support for the reel. It will be noticed that packing indicated at 20 is arranged within the casing 13 between the hollow shaft and the casing and between the washer 14 and the nut 15.

It will be understood that the reel might be used in connection with air hose as well as in connection with water hose.

I claim:—

A hose reel having a hollow hub and provided at one end with a journal pin for engaging a support, an expansion chamber within one end of the hollow hub, a supply pipe extending through the other end of the reel and axially of the hub to the expansion chamber, a nipple extending radially from the expansion chamber for connection with a hose, the hub inclosing the supply pipe, and the expansion chamber.

GEORGE L. PERRINE.

Signed in presence of—
  H. HENDERSON,
  S. C. COOK.